(No Model.)
J. S. BIGGAR
TELEPHONE.
No. 543,843. Patented Aug. 6, 1895.
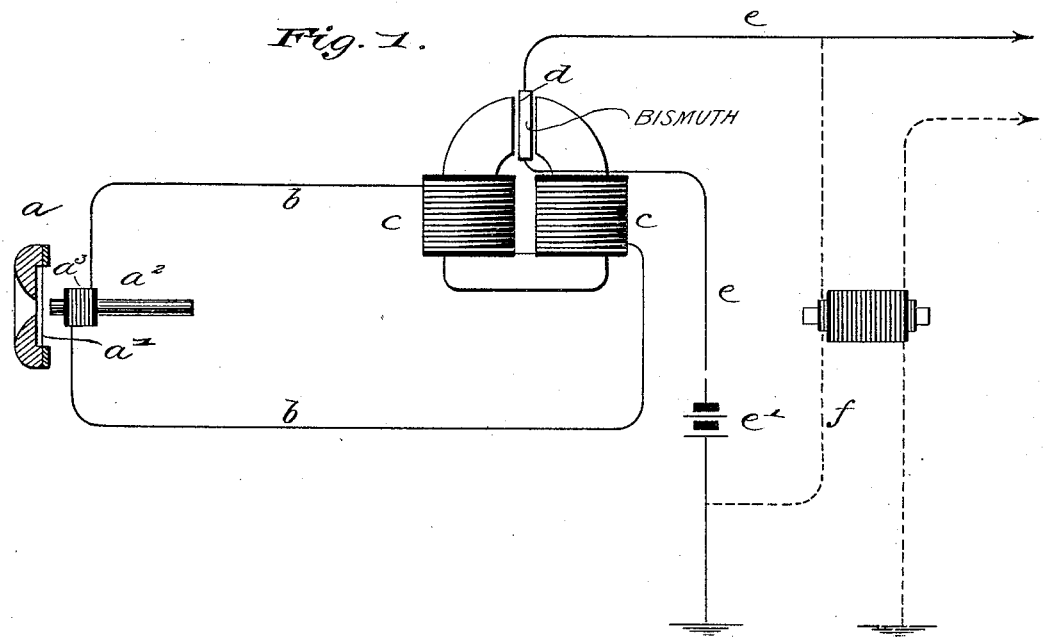
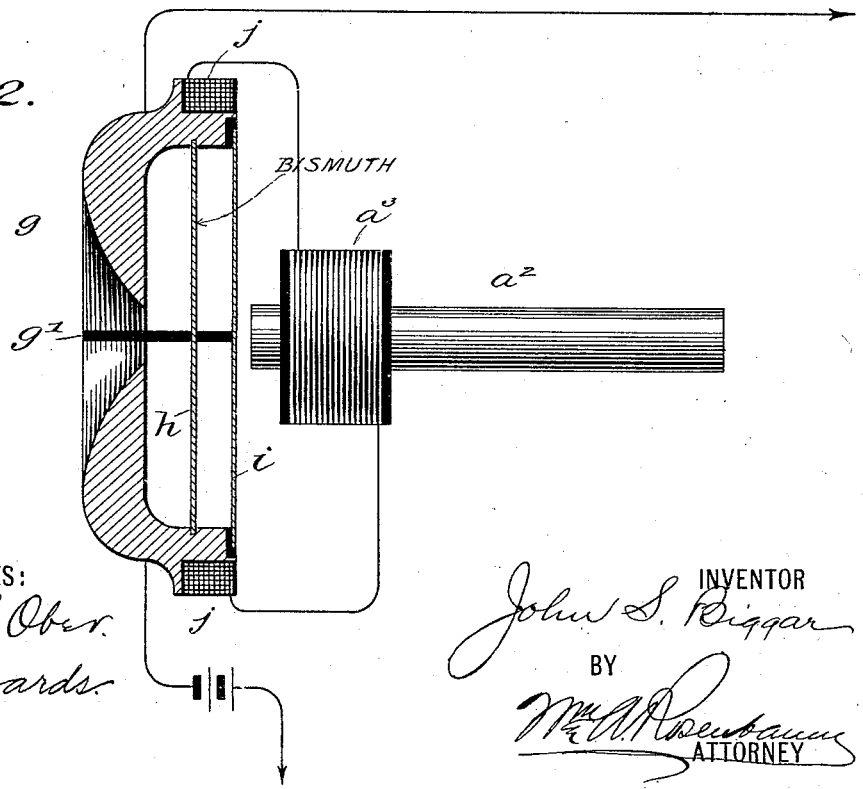
WITNESSES:
Frank S. Ober.
C. V. Edwards.
INVENTOR
John S. Biggar
BY
Wm. A. Rosenbaum
ATTORNEY

UNITED STATES PATENT OFFICE.

JOHN STUART BIGGAR, OF SAN FRANCISCO, CALIFORNIA.

TELEPHONE.

SPECIFICATION forming part of Letters Patent No. 543,843, dated August 6, 1895.

Application filed November 16, 1894. Serial No. 529,024. (No model.)

*To all whom it may concern:*

Be it known that I, JOHN STUART BIGGAR, a citizen of the United States, residing at San Francisco, in the county of San Francisco and State of California, have invented certain new and useful Improvements in Telephones, of which the following is a full, clear, and exact description.

This invention relates to telephony, the object being to produce a transmitter wherein the electrodes are dispensed with and of a construction which shall be simple and efficient. The principle which I make use of in the construction of my transmitter is in the fact that some materials when placed in a magnetic field or subjected to magnetic influence will vary in electric conductivity. In the present instrument I place in the circuit of an ordinary magneto-telephone an electro-magnet, in the magnetic field of which is located a piece of bismuth or similar material, the electric conductivity of which may be changed by a magnetic field, and place said piece of bismuth directly in the circuit leading to a receiving-instrument or induction-coil, as the case may be.

The invention will be described in detail with reference to the accompanying drawings, in which—

Figure 1 is a diagrammatical representation of the apparatus and circuits constituting my invention. Fig. 2 illustrates a special form of instrument embodying my invention.

$a$ represents an ordinary magneto-telephone consisting of diaphragm $a'$, permanent magnet $a^2$, and coil $a^3$. The circuit $b$, which includes the coil $a^3$, also includes the coils of an electromagnet $e$. The poles of the magnet $c$ are arranged facing each other with a space between them, in which is located a block of bismuth $d$ or other material which will change its electric conductivity under magnetic influence. The block of bismuth is connected directly and permanently in the main circuit $e$ of battery $e'$.

The electrical impulses or undulations which are set up in the circuit $b$ by the vibratory movement of diaphragm $a'$, caused by the sound-waves, will create corresponding magnetic impulses or undulations in the magnetic circuit of magnet $c$. Inasmuch as the block of bismuth $d$ is cut by the lines of force traveling in this magnetic circuit it will be subjected to all such impulses or undulations. Consequently its resistance to the flow of current upon the main circuit $e$ will vary in accordance with the sound-waves directed to the instrument $a$, and a receiving-instrument placed in the main circuit will be affected in the usual manner and reproduce the sounds. The phenomenal action of bismuth herein referred to is well known, and no attempt to explain it will be made or is necessary.

It may be desirable to use an induction-coil with the apparatus. If so, the piece of bismuth will be in the closed primary circuit of the induction-coil, as indicated by the dotted lines $f$, and the main line will, as usual, be connected with the secondary coil.

In Fig. 2 I have illustrated a form of apparatus which is compact, in that it embodies the magnet, the block of bismuth, and the magneto-instrument in one apparatus. The funnel or mouthpiece $g$ of the instrument will be of metal and divided in two parts, the parts being separated by insulating material, as indicated at $g'$. There will be two diaphragms, one $h$ of bismuth and the other $i$ of soft iron and of the usual construction. The latter will be insulated from the mouthpiece. Between the two diaphragms will be an air-chamber which will conduct the vibrations of one diaphragm to the other. Back of the iron diaphragm will be placed the usual permanent magnet and coil.

$j$ represents a coil of wire wound upon the mouthpiece of the instrument and surrounding the bismuth diaphragm. This coil will be in a closed circuit with the coil upon the permanent magnet. The two parts of the mouthpiece will form the terminals of the main circuit, and they are bridged, as shown, by the bismuth diaphragm. It will be seen that the bismuth diaphragm is located in the magnetic circuit of the coil $j$, and that it will therefore be subjected to the variations in magnetic force, which will cause it to vary the flow of current in the main circuit.

Having thus described my invention, I claim—

1. In telephony, a means of varying the resistance of an electric circuit which consists of an electro-magnet, in the magnetic path of which is located a portion of said circuit consisting of material whose resistance to the flow of current can be varied by the passage of magnetic lines of force through it.

2. In a telephone transmitter, a section of the circuit consisting of material capable of changing its electric conductivity, when cut by magnetic lines of force, in combination with an electro-magnet in whose field of force said section of the circuit is located.

3. In a telephone transmitter, a section of the circuit consisting of material capable of changing its electric conductivity when cut by magnetic lines of force, in combination with an electro-magnet in whose field of force said section of the circuit is located, and a magneto-electric instrument in circuit with said electro-magnet.

4. In telephony, a circuit in which electrical undulations are set up by sound waves, in combination with an electro-magnet in said circuit, and a main circuit, a portion of which, consisting of material capable of changing its electric conductivity when cut by magnetic lines of force, is located in the field of force of said magnet, for the purpose set forth.

5. In telephony, a circuit in which electrical undulations are set up by sound waves, in combination with an electro-magnet in said circuit, and a main circuit, a portion of which, consisting of a piece of bismuth, is located in the field of force of said magnet, for the purpose set forth.

In testimony whereof I subscribe my signature in presence of two witnesses.

JOHN STUART BIGGAR.

Witnesses:
J. G. WHITE,
H. J. LANG.